United States Patent
Horne

[15] 3,668,515
[45] June 6, 1972

[54] LOAD CONTROL SYSTEM EMPLOYING SILICON CONTROLLED RECTIFIERS WITH OVERVOLTAGE PROTECTION AND COMPENSATION FOR LINE VOLTAGE FLUCTUATIONS

[72] Inventor: Arthur P. Horne, Portland, Oreg.
[73] Assignee: Electronics Diversified, Inc., Portland, Oreg.
[22] Filed: Jan. 30, 1970
[21] Appl. No.: 7,093

[52] U.S. Cl. .................. 323/22 SC, 307/202, 307/252 F, 307/252 T, 317/33 VR, 323/24
[51] Int. Cl. ......................................................... G05f 5/00
[58] Field of Search .................. 323/9, 22 SC, 24; 317/33; 307/202, 252 F, 252 T

[56] References Cited

UNITED STATES PATENTS 3,374,420   3/1968   Weber, Jr. .................. 323/9
3,181,009   4/1965   Felcheck .................. 307/252 F Primary Examiner—Gerald Goldberg
Attorney—Buckhorn, Blore, Klarquist and Sparkman

[57] ABSTRACT

A control system for a load includes a pair of oppositely poled silicon controlled rectifiers disposed in parallel between a line and the load, each being provided with a drive circuit energized from across the rectifiers for triggering each silicon controlled rectifier at a predetermined time by discharging a capacitor via a control transistor. The triggering time is controllable. The triggering circuitry is empowered from the line whereby triggering also varies in a manner for maintaining a relatively constant output despite changes in line voltage. Each control transistor is additionally triggerable when the voltage across the pair of rectifiers reaches an excessive value, whereby the rectifiers are turned on alternately with each rectifier protecting the other.

20 Claims, 1 Drawing Figure

PATENTED JUN 6 1972
3,668,515
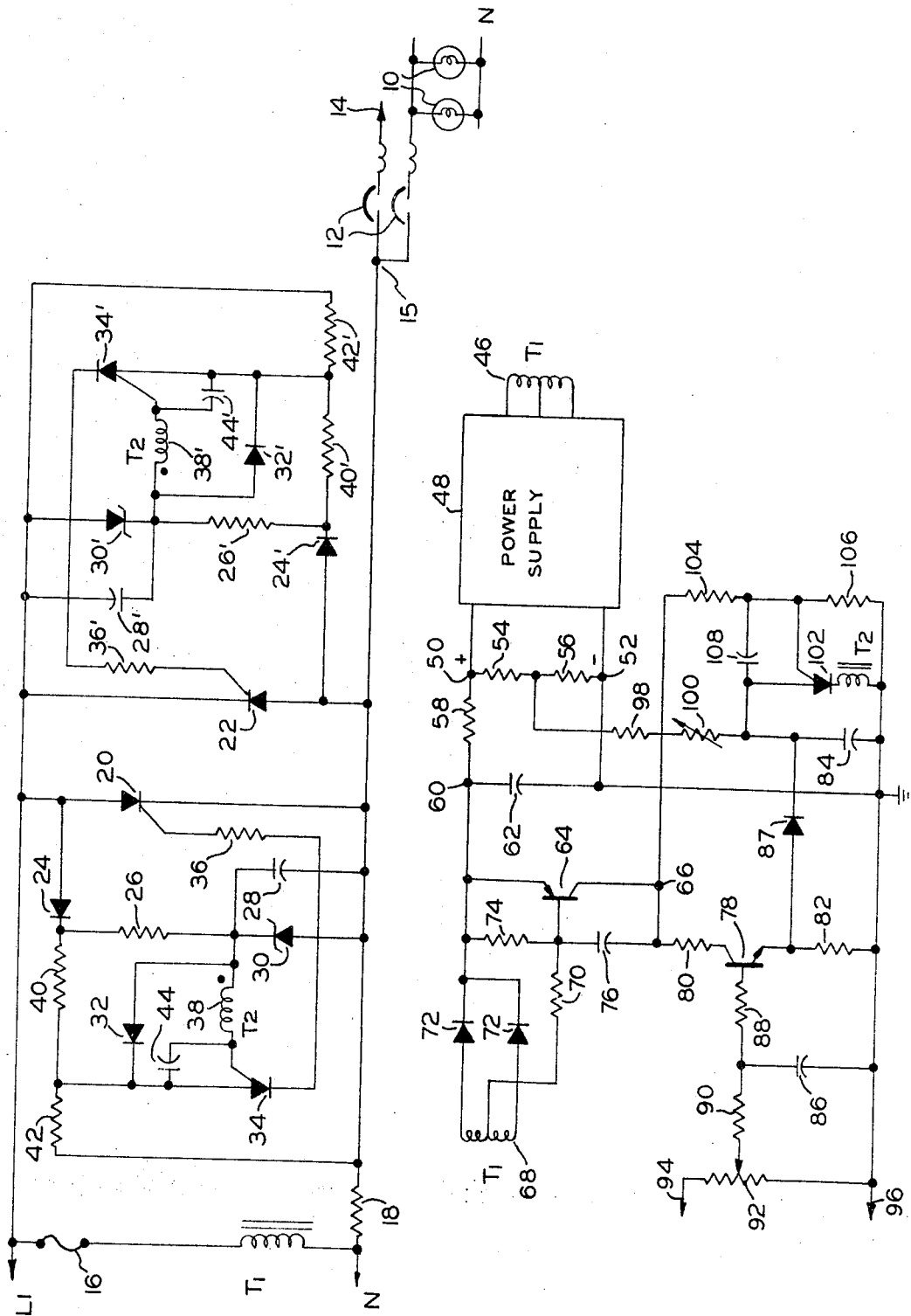
ARTHUR P. HORNE
INVENTOR
BY
BUCKHORN, BLORE, KLARQUIST & SPARKMAN
ATTORNEYS 3,668,515

1

LOAD CONTROL SYSTEM EMPLOYING SILICON CONTROLLED RECTIFIERS WITH OVERVOLTAGE PROTECTION AND COMPENSATION FOR LINE VOLTAGE FLUCTUATIONS

BACKGROUND OF THE INVENTION

Modern dimmer systems for lighting circuit desirably employ silicon controlled rectifiers as control elements by means of which the proportion of each alternating current half cycle reaching the load can be varied. While other devices can be utilized in place of silicon controlled rectifiers, silicon controlled rectifiers are fast-acting and dependable. They are also relatively insensitive to the type of load, i.e. whether the load is inductive or not, and in general display advantageous operating characteristics. However, the means for triggering silicon controlled rectifiers in an alternating current circuit can be relatively complicated. Isolation of triggering circuitry from the line is frequently required, and large drive pulses are delivered to the silicon controlled rectifiers by way of isolation transformers. Silicon controlled rectifiers are also subject to failure if an excessive voltage is applied thereacross. Of course, rectifiers having ratings exceeding any possible overvoltage condition can be used, but this naturally entails additional expense.

SUMMARY OF THE INVENTION

According to the present invention, a control system employs a pair of back-to-back silicon controlled rectifiers disposed between an input supply terminal and the load terminal, wherein the silicon controlled rectifiers are connected in opposite polarity directions. A separate drive circuit is coupled across each silicon controlled rectifier and this circuit "floats" on the line. Drive energy for turning on each silicon controlled rectifier at its gate is derived from across each silicon controlled rectifier, preferably via a capacitor charged across the rectifier. Drive power under normal conditions is applied until the rectifier turns on, and then no more power is provided to the drive circuit connected thereacross. Drive power is not transformer coupled, nor is energy dissipated when a rectifier is on.

Each drive circuit also includes overvoltage protection. Means responsive to the voltage across the silicon controlled rectifier triggers operation thereof as the voltage thereacross reaches a predetermined excessive value. When such value is reached, the rectifier is turned on substantially continuously during the half cycles it is poled to conduct. In this manner, each rectifier protects the other against excessive inverse voltage which might cause failure thereof.

In accordance with another aspect of the present invention, the system provides a relatively constant output with changes in line voltage. Timing control circuitry is powered from a power supply coupled to the same line to which the corresponding pair of silicon controlled rectifiers is coupled. A semiconductor device, suitably taking the form of a programmable unijunction transistor, is operated for firing a silicon controlled rectifier sooner when the power supply voltage, and hence the line voltage, drops, or for delaying firing if the power supply voltage increases.

It is accordingly an object of the present invention to provide an improved alternating current load control system employing silicon controlled rectifiers which are driven at predetermined times by non-complex circuitry operating to ensure proper turn-on of said silicon controlled rectifiers.

It is a further object of the present invention to provide an improved alternating current load control system employing silicon controlled rectifiers wherein power dissipation is minimized.

It is another object of the present invention to provide an improved alternating current load control system employing silicon controlled rectifiers wherein said rectifiers are protected against steady state and transient overvoltage conditions.

2

It is a further object of the present invention to provide an improved alternating current load control system employing silicon controlled rectifiers wherein a more nearly constant output is provided, with fluctuations in line voltage.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawing wherein like reference characters refer to like elements.

DRAWING

The single FIGURE is a schematic diagram of a control system according to the present invention.

DETAILED DESCRIPTION

The circuit of the FIGURE represents one plug-in unit of the plurality of plug-in units which may be employed in a light dimmer system. Thus, the circuit illustrated in the figure is disposed between a first line terminal labeled L1 and output terminal 15 connected to a bank of lamps 10 in parallel and having their opposite terminals returned to a neutral terminal labeled N. A pair of circuit breakers, 12, is suitably located between terminal 15 and the bank of lamps as well as between terminal 15 and other banks of lamps which may be similarly connected at terminal 14. The circuit includes transformers labeled $T_1$ and $T_2$, the primary and secondary windings of which are separated for ease of illustration. In each case, the transformer core is schematically illustrated next to the transformer primary. In a complete dimmer system, units similar to the one diagrammed in the sale figure of this application couple other supply lines to additional lighting circuits which are returned to the same neutral connection N.

A fuse 16 couples line L1 to the primary of transformer $T_1$, while the remaining terminal of this primary winding is connected to the neutral return. A pair of silicon controlled rectifiers 20 and 22 are connected in reverse polarity directions between line L1 and output or load terminal 15. For example, silicon controlled rectifier 20 has its anode connected to line L1 and its cathode connected to terminal 15, while silicon controlled rectifier 22 has its anode connected to terminal 15 and its cathode returned to line L1.

A drive circuit for silicon controlled rectifier 20 comprises a diode rectifier 24 having its anode connected to line L1 and its cathode coupled via resistor 26 to a first terminal of capacitor 28, the remaining terminal of which is returned to terminal 15. A Zener diode 30 is disposed across capacitor 28, with the anode of the Zener diode being connected to terminal 15. A diode 32 couples the junction of resistor 26 and capacitor 28 to the anode of a programmable unijunction transistor device 34, manufactured by the General Electric Company. The latter has its cathode coupled to the gate of silicon controlled rectifier 20 by way of dropping resistor 36. The diode 32 is poled in the same current direction as diode rectifier 24 and transistor 34, i.e. the anode of diode 32 is connected to the junction between resistor 26 and capacitor 28. A secondary winding 38 of transformer $T_2$ is interposed between the junction of resistor 26 with capacitor 28, and the gate of programmable unijunction transistor 34. A capacitor 44 is inserted between the anode and gate terminals of transistor 34.

The drive circuit also includes an overvoltage protection circuit comprising resistors 40 and 42 disposed serially in voltage divider fashion between the cathode of diode rectifier 24 and load terminal 15. The center tap between resistors 40 and 42 is connected to the anode of transistor 34.

The drive circuit associated with silicon controlled rectifier 22 is substantially identical to that described above, except the whole circuit is reversed between line L1 and terminal 15, in accordance with the polarity reversal of rectifier 22. This portion of the circuit will not be described in detail, but rather similar components are referred to by primed reference numerals. Resistor 18 disposed between terminal 15 and neutral provides a minimum load for the silicon controlled rectifiers.

Secondary 46 of transformer $T_1$ drives a power supply 48 having output terminals 50 and 52. Terminal 52 is grounded, and a voltage divider comprising resistors 54 and 56 serially connected in that order is disposed across the power supply output terminals. Resistor 58 couples ungrounded power supply terminal 50 to terminal 60, bypassed to ground with capacitor 62.

A Switching circuit comprising PNP transistor 64 is powered by power supply 48 and provides terminal 66 with a given output voltage pulse for nearly the duration of each half wave of alternating current provided at line L1. Switching transistor 64 is turned off and on by a circuit including another secondary winding 68 of transformer $T_1$, having its center tap connected to the base of transistor 64 via resistor 70, and having its end terminals connected to the emitter of transistor 64 by diodes 72. Each of the diodes is poled with its anode connected to winding 68 and its cathode connected to emitter 64. An input resistor 74 is located between the base and emitter of transistor 64, while a stabilizing capacitor 76 is interposed between the collector and base of transistor 64. The collector of transistor 64 is connected to terminal 66.

NPN transistor 78 forms part of a ramp and pedestal circuit and has its collector connected to terminal 66 by way of resistor 80. The emitter of transistor 78 is returned to ground through resistor 82, and this transistor drives capacitor 84 in emitter-follower fashion through diode 87 having its anode connected to the emitter of transistor 78. The base of transistor 78 is coupled to input capacitor 86 via resistor 88, while another coupling resistor 90 is disposed between the junction of resistor 88 with capacitor 86, and the movable tap of potentiometer 92 which is suitably connected between input voltage terminals 94 and 96. Control 92 is employed for selecting the light output desired for lamps 10. Terminal 96 and the remaining terminals of capacitors 84 and 86 are grounded.

Resistor 98 and a variable resistor 100 in series therewith are connected between the resistor 54-resistor 56 center tap, and the junction between diode 87 and capacitor 84. A programmable unijunction transistor 102, of the type manufactured by the General Electric Company, has its anode coupled to the ungrounded end of capacitor 84 and its cathode coupled through the primary winding of transformer $T_2$ to ground. A voltage divider comprising resistors 104 and 106 in series is connected between terminal 66 and ground while the center tap of this voltage divider is coupled to the gate of programmable unijunction transistor 102. A noise suppression capacitor 108 is interposed between the anode and gate terminals of transistor 102.

Considering operation of the present circuit, power supply 48, energized from transformer $T_1$, provides a DC voltage between terminals 50 and 52 commensurate with the line voltage at line L1. During each half cycle of alternating current introduced at line L1, whether it be positive or negative, transistor 64 is turned on at its base by the circuit comprising diodes 72, winding 68, and resistor 70. During each half cycle, a current is conducted through resistor 74 providing a voltage which is positive at the emitter of transistor 64, and which is negative at the base of transistor 64. This circuit provides a voltage at terminal 66 for nearly entirely the duration of each half cycle of alternating current during which time transistor 64 is substantially completely on to provide power supply voltage at terminal 66, but shuts off for an instant between half cycles. Since transistor 64 conducts for nearly the duration of each half cycle, control is afforded which permits energization of lamps 10 during nearly the entire alternating current input waveform, if this degree of brilliance is desired.

A ramp and pedestal signal, as commonly known in the art, is developed across capacitor 84. The pedestal or substantially square wave portion of the voltage developed is provided from transistor 78 via diode 87 and has a value in accord with the setting of the potentiometer 92. During each half cycle of circuit operation, the voltage provided at terminal 66 through transistor 64 energizes transistor 78 at its collector and the transistor 78 delivers a current through diode 87 for relatively rapidly charging capacitor 84 to the value provided at the low impedance emitter of transistor 78. The value to which capacitor 84 is charged is in turn determined by the voltage to which capacitor 86 is charged via resistor 90 from potentiometer 92.

The "ramp" portion of the ramp and pedestal signal is supplied by further charging capacitor 84 through resistors 98 and 100 from the center tap of resistors 54 and 56. When capacitor 84 charges to a given voltage, unijunction transistor 102 will fire and discharge capacitor 84 through the primary of transformer $T_2$. Thus, the unijunction transistor 102 discharges capacitor 84 during each half cycle of input on line L1. The time at which unijunction transistor 102 provides a pulse to transformer $T_2$ is determined, among other things, by the height of the pedestal which is in turn determined by the setting of potentiometer 92. Therefore, the firing time of the unijunction transistor 102 during each half cycle is determined by the setting of potentiometer 92, potentiometer 92 being the illumination control.

The firing time is also determined by the gate voltage for transistor 102 derived at the interconnection of resistors 104 and 106. This voltage is in turn proportional to the voltage at terminal 66 which nearly equals the power supply voltage during the continuance of a half cycle of alternating current input. If the power supply voltage decreases, indicating a drop in line voltage at L1, the voltage at the gate of transistor 102 decreases, and unijunction transistor 102 will fire earlier during each half cycle. As will therefore be understood, lamps 10 will receive current earlier in each half cycle, thereby counteracting the drop in voltage. Similarly, if the line L1 voltage, and therefore the power supply voltage, increases, the voltage at the gate of transistor 102 increases, and transistor 102 will fire later in each half cycle whereby lamps 10 will receive current for a shorter portion of each half cycle of alternating current input, thereby compensating for the increase in line voltage. The light output from lamps 10 is suitably constant within a relatively wide range of input line voltage variation, or at least the output illumination variation is less, for example, than would be the case with the lamps connected directly to the line.

Since power supply 48 energizes voltage divider 54, 56, as well as terminal 66, the effect of a power supply voltage drop is counteractive at the anode and gate of transistor 102. However, resistors 54, 56, and 58 as well as resistors 104 and 106 are proportioned so that the effect of a change in voltage predominates at the gate electrode of transistor 102.

Potentiometer 92 is normally remotely located from the rest of the circuit, with terminals 94 and 96 being connected to a relatively constant voltage. As a result, the settings of various similar potentiometers for various lighting circuits can be standardized. However, the collector of transistor 78 is coupled to terminal 66 via resistor 80, and this has the effect of causing transistor 102 to compensate for line voltage changes similarly for various settings of potentiometer 92. Of course, potentiometer 92 is used to select lamp output in any case, but without the circuit as shown, the degree of compensation achieved by transistor 102 would undesirably vary with the setting of potentiometer 92.

As voltage appears between line L1 and neutral connection N, diode rectifier 24 supplies current for charging capacitor 28 through resistor 26 during each positive half cycle. Zener diode 30 clamps the charge voltage at a given value, which was 33 volts in the case of a specific embodiment. Through the DC resistance of winding 38, the gate of unijunction transistor 34 is also raised to substantially the same voltage. At the same time, the drop across diode 32 is such that the anode of transistor 34 resides at a somewhat lower voltage, e.g. 32.4 volts. Under these conditions, the unijunction transistor 34 does not conduct. However, when unijunction transistor 102 fires, discharging current from capacitor 84 through the primary of transformer T₂, a small impulse is present across winding 38, this impulse being relatively negative at the gate of transistor 34. The impulse brings the gate down to approximately 31.8 volts or slightly less in a given example, and fires the unijunction transistor 34. Unijunction transistor 34 conducts through diode 32 and dropping resistor 36, discharging capacitor 28 into the gate in silicon controlled rectifier 20. This discharge is "lengthened" by dropping resistor 36 and has a time period sufficient for making certain that rectifier 20 conducts. Adequate drive is provided until rectifier 20 does conduct. It is observed the drive for silicon controlled rectifier 20 is derived from across rectifier 20 via the charging of capacitor 28. Only a small impulse is coupled via transformer T₂ for initiating conduction of unijunction transistor 34. As soon as rectifier 20 conducts, the control circuit is shunted with no further power being lost therein. Capacitor 44 is employed for noise suppression.

Of course, the silicon controlled rectifier 20, once turned on, stays on for the duration of the particular positive half cycle during which it was turned on. Thus, the adjustment by means of potentiometer 92 of the relative phase position during a given half cycle at which a silicon controlled rectifier is turned on is effective to determine the power delivered to lamps 10 and therefore the illumination produced thereby.

Under normal operating conditions, the overvoltage portion of the circuit comprising resistors 40 and 42 does not affect the aforementioned operation. That is, at normal line voltage, the voltage at the center tap between resistors 40 and 42 has no effect on the operation of transistor 34. However, should the voltage on line L1 rise to a predetermined objectionable value such that voltage divider 40, 42 raises the anode of transistor 34 approximately 0.6 volts above the gate, transistor 34 will conduct. Under continuous overvoltage conditions, transistor 34 conducts substantially for the duration of each positive half cycle, turning on rectifier 20 for a similar period. Rectifier 20 drops the voltage across rectifier 22 and prevents excessive inverse voltage from appearing across the latter. Thus, the voltage across the pair of silicon controlled rectifiers is limited, even though an excessive line to neutral voltage may occur. The protection is effective for either transient or steady state overvoltage conditions.

The resistance of resistor 26 is comparatively low, but permits the voltage across voltage divider 40, 42 to rise above the voltage across capacitor 28 and Zener diode 30. When the voltage at the center tap of voltage divider 40, 42 rises in response to an overvoltage condition, diode 32 ceases to conduct at that time such that the anode of transistor 34 can rise above the gate. The circuit comprising resistors 40 and 42 together with programmable unijunction transistor 34 functions as a voltage comparison circuit in the detection of an overvoltage condition.

The drive circuit for rectifier 22 operates rectifier 22 during half cycles of the voltage waveform appearing on line L1 which are negative with respect to neutral connection N. The drive circuit for rectifier 22 operates substantially similarly to the one described above, both for turning on rectifier 22 at a predetermined time with respect to the phase of the negative half cycle input, and with respect to overvoltage protection. In the case of overvoltage protection, rectifier 22 is turned on when the voltage on line L1 is excessive whereby to prevent the application of destructive inverse voltage across rectifier 20, each rectifier thus protecting the other. In the case of each of the circuits, diode rectifiers 24 and 24' operate the respective drive circuits only during half cycles of the correct polarity.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. In a load control system,
   an input terminal adapted to be connected to a source of alternating current,
   an output terminal adapted to be connected to a load to which an adjustable amount of power is to be delivered,
   a pair of silicon controlled rectifiers disposed in circuit between said input and output terminals with one connected in a polarity direction reversed with respect to the other, wherein said rectifiers are adapted to conduct current from said source to said load on opposite polarity half cycles,
   and a drive circuit coupled across the principal current carrying terminals of a said silicon controlled rectifier, said drive circuit including first means for controllably triggering operation of said last mentioned rectifier by driving the gate of said rectifier for turning on said rectifier during successive alternating current half cycles of a given polarity and in predetermined phase relation therewith, the drive energy applied to said gate for turning on said rectifier being principally derived from across said silicon controlled rectifier, and second means responsive to the voltage across the principal current carrying terminals of said silicon controlled rectifier for also triggering operation of said silicon controlled rectifier if the voltage thereacross reaches a predetermined excessive value in order to protect the remaining silicon controlled rectifier from an overvoltage condition.

2. The system according to claim 1 wherein said first means includes a capacitor charged from across said silicon controlled rectifier and control means for discharging said capacitor into the gate of said rectifier, said control means having a first triggerable terminal operable in predetermined controllable phase relation with successive alternating current half cycles of said given polarity to bring about conduction of said control means to discharge said capacitor.

3. The system according to claim 2 wherein said control means comprises a unijunction transistor disposed between said capacitor and the gate of said rectifier.

4. The system according to claim 3 further including a transformer for receiving triggering pulses in predetermined phase relation with successive alternating current half cycles, said first triggerable terminal comprising the gate of said unijunction transistor coupled in driven relation to a secondary of said transformer.

5. The system according to claim 2 where said second means comprises means for applying at least a portion of the voltage across said rectifier to a triggerably terminal of said control means.

6. The system according to claim 5 wherein said control means comprises a unijunction transistor, the last mentioned triggerable terminal comprising an anode terminal thereof, and said first triggerable terminal comprising the gate terminal thereof.

7. The system according to claim 1 wherein said first means comprises a capacitor and a charging circuit including a diode for charging said capacitor from across said silicon controlled rectifier,
   said first means further including a unijunction transistor coupling said capacitor to the gate of said silicon controlled rectifier for discharging said capacitor into said gate of said silicon controlled rectifier as said unijunction transistor is operated,
   said first means further including a trigger transformer having a secondary disposed between the charged end of said capacitor and the gate of said unijunction transistor,
   and a diode disposed between the charged end of said capacitor and the anode of said unijunction transistor, the last mentioned diode being poled in a common polarity direction with the first mentioned diode and said unijunction transistor,
   said second means comprising a voltage divider coupled across said rectifier via said first mentioned diode, wherein a tap on said voltage divider is coupled to the anode of said unijunction transistor.

8. The system according to claim 7 further including a Zener diode coupled across said capacitor and a resistance between said Zener diode and the first mentioned diode.

9. The system according to claim 8 further including a dropping resistor between said unijunction transistor and the gate of said rectifier.

10. The system according to claim 2 including a transformer the secondary of which is coupled to the first triggerable terminal, and means for triggering the primary of said transformer, said last mentioned means comprising:
   a switching circuit coupled to said input terminal and adapted to provide a current flow path during each half cycle of current from said source,
   a second capacitor adapted to be charged from said current flow path and semiconductor means triggerable from the charge of said second capacitor for energizing the primary of said transformer,
   controllable means for adjusting the charge delivered to said second capacitor via said current flow path,
   and resistive means for providing an additional current flow path to said second capacitor.

11. The system according to claim 10 further including a power supply coupled to said input terminal and providing the current in the first mentioned current flow path as well as providing control current at said semiconductor means proportional to the voltage at the input terminal for causing said semiconductor means and said control means to be operable in said predetermined phase relation at an earlier time with a decrease in voltage at said input terminal, and later with an increase in voltage at said input terminal, for lessening variation in the output delivered at said output terminal.

12. The system according to claim 11 wherein said semiconductor means comprises a unijunction transistor deriving its gate voltage from said power supply.

13. The system according to claim 11 wherein said controllable means comprises a semiconductor device included in the first mentioned current flow path, and means for applying a control input to said semiconductor device.

14. The system according to claim 11 wherein said switching circuit provides the said control current by way of the first mentioned current flow path.

15. The system according to claim 11 wherein said power supply also provides current in said additional current flow path, with the said control current predominating in proportional effect whereby to operate said semiconductor means for lessening the effect of input voltage changes.

16. In a load control system,
   an input terminal adapted to be connected to a source of alternating current,
   an output terminal adapted to be connected to a load to which an adjustable amount of power is to be delivered,
   a pair of silicon controlled rectifiers disposed in circuit between said input and output terminals with one connected in a polarity direction reversed with respect to the other, wherein said rectifiers are adapted to conduct current from said source to said load on opposite polarity half cycles,
   and a drive circuit coupled across the principal current carrying terminals of a said silicon controlled rectifier, said drive circuit including means for controllably triggering operation of said last mentioned rectifier by driving the gate of said rectifier for turning on said rectifier during successive alternating current half cycles of a given polarity and in predetermined phase relation therewith,
   said means including a capacitor charged from across said silicon controlled rectifier, and semiconductor control means for discharging said capacitor into the gate of said rectifier,
   said semiconductor control means having a first triggerable terminal operable in predetermined controllable phase relation with successive alternating current half cycles of said given polarity to bring about conduction of said control means to discharge said capacitor,
   and a transformer having a winding coupled to said first triggerable terminal for receiving a control signal in said predetermined phase relation.

17. The system according to claim 16 wherein the remaining silicon controlled rectifier is provided with a substantially similar but separate drive circuit.

18. In a load control system,
   an input terminal adapted to be connected to a source of alternating current,
   an output terminal adapted to be connected to a load to which an adjustable amount of power is to be delivered,
   a pair of silicon controlled rectifiers disposed in circuit between said input and output terminals with one connected in a polarity direction reversed with respect to the other,
   wherein said rectifiers are adapted to conduct current from said source to said load on opposite polarity half cycles,
   and means connected directly across the principal current carrying terminals of a said silicon controlled rectifier for triggering operation thereof when the voltage thereacross exceeds a predetermined excessive value, in order to protect the remaining silicon controlled rectifier from an inverse overvoltage condition.

19. In a load control system, an input terminal adapted to be connected to a source of alternating current,
   an output terminal adapted to be connected to a load to which an adjustable amount of power is to be delivered,
   silicon controlled rectifier means disposed in circuit between said input and output terminals,
   d.c. power supply means energized from said input terminal,
   control means for providing a predetermined output with each half cycle of the alternating current input applied to said input terminal, for application to said silicon controlled rectifier means at predetermined times relative to each half cycle of alternating current input,
   said control means comprising a capacitor charged during each half cycle of alternating current input and unijunction transistor means having its anode-cathode path coupled to said capacitor for being triggered by the charge on said capacitor and for thereupon triggering said silicon controlled rectifier means
   the gate of said unijunction transistor means being coupled to the output of said d.c. power supply means for providing a further control in operation of said unijunction transistor for detecting changes in the output of said power supply for advancing the triggering of said silicon controlled rectifier means as the power supply output decreases and for retarding the triggering of said silicon controlled rectifier means as the power supply output increases.

20. The system according to claim 19 wherein said control means further includes an adjustable element for controlling charge current to said capacitor.

* * * * *